(12) United States Patent
Pasquero et al.

(10) Patent No.: US 9,436,281 B2
(45) Date of Patent: Sep. 6, 2016

(54) ELECTRONIC DEVICE AND METHOD OF PROVIDING TACTILE FEEDBACK

(75) Inventors: Jerome Pasquero, Kitchener (CA); Norman Miner Ladouceur, Waterloo (CA); Jason Tyler Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 912 days.

(21) Appl. No.: 13/094,528

(22) Filed: Apr. 26, 2011

(65) Prior Publication Data

US 2012/0275086 A1    Nov. 1, 2012

(51) Int. Cl.
*G06F 3/01* (2006.01)
*G06F 1/16* (2006.01)
*G06F 3/041* (2006.01)
*H04M 1/02* (2006.01)
*H04M 19/04* (2006.01)

(52) U.S. Cl.
CPC .............. *G06F 3/016* (2013.01); *G06F 1/1626* (2013.01); *G06F 3/041* (2013.01); *H04M 1/026* (2013.01); *H04M 19/047* (2013.01)

(58) Field of Classification Search
CPC .......... G06F 3/041; G06F 3/01; G06F 3/048; G06F 1/16; G06F 3/0414; G06F 3/0488; G06F 3/0416; G06F 2203/014
See application file for complete search history.

(56) References Cited

U.S. PATENT DOCUMENTS

| 6,118,435 | A | 9/2000 | Fujita et al. |
| 6,469,692 | B2 | 10/2002 | Rosenberg |
| 6,492,978 | B1 * | 12/2002 | Selig et al. ................... 345/173 |
| 6,693,626 | B1 * | 2/2004 | Rosenberg .................... 345/168 |
| 6,697,044 | B2 | 2/2004 | Shahoian et al. |
| 6,710,518 | B2 | 3/2004 | Morton et al. |
| 6,717,573 | B1 * | 4/2004 | Shahoian et al. ............. 345/161 |
| 7,453,442 | B1 | 11/2008 | Poynter |
| 7,468,573 | B2 | 12/2008 | Dai et al. |
| 7,548,232 | B2 | 6/2009 | Shahoian et al. |
| 7,646,378 | B2 | 1/2010 | Hirshberg |
| 7,656,393 | B2 | 2/2010 | King et al. |
| 8,199,107 | B2 * | 6/2012 | Xu et al. ....................... 345/158 |
| 2002/0084721 | A1 | 7/2002 | Walczak |
| 2004/0046746 | A1 | 3/2004 | Monson |
| 2006/0052143 | A9 | 3/2006 | Tuovinen |
| 2006/0209037 | A1 * | 9/2006 | Wang et al. .................. 345/173 |

(Continued)

FOREIGN PATENT DOCUMENTS

EP    2 202 621    6/2010
WO    WO 97/41677    11/1997

OTHER PUBLICATIONS

European Application No. EP 11163759.1, EP Search Report dated Sep. 7, 2011.

(Continued)

*Primary Examiner* — William Boddie
*Assistant Examiner* — Bryan Earles
(74) *Attorney, Agent, or Firm* — Borden Ladner Gervais LLP; Geoffrey deKleine

(57) ABSTRACT

A portable electronic device comprising a display, an actuator actuatable to impart a force on the display, an input device moveable from a first position in which the input device is disengaged from the display to a second position in which the input device is engaged with the display, wherein when the input device is moved to the second position, the actuator is actuated to provide tactile feedback to the input device through the display.

9 Claims, 5 Drawing Sheets

(56) References Cited

U.S. PATENT DOCUMENTS

| | | |
|---|---|---|
| 2007/0029483 A1 | 2/2007 | James et al. |
| 2007/0229483 A1* | 10/2007 | Rosenberg et al. ............ 345/204 |
| 2008/0084657 A1* | 4/2008 | Baba et al. .................... 361/681 |
| 2008/0150894 A1* | 6/2008 | Chiang ......................... 345/163 |
| 2008/0198139 A1 | 8/2008 | Lacroix et al. |
| 2008/0211696 A1 | 9/2008 | Griffin et al. |
| 2009/0040175 A1 | 2/2009 | Xu et al. |
| 2009/0237275 A1 | 9/2009 | Vaganov |
| 2009/0237364 A1 | 9/2009 | Bloomcamp et al. |
| 2010/0225600 A1* | 9/2010 | Dai ......................... G06F 3/016 345/173 |
| 2011/0012849 A1* | 1/2011 | Cho et al. ..................... 345/173 |
| 2011/0074560 A1 | 3/2011 | Pfau et al. |

OTHER PUBLICATIONS

Examiner's Report dated Aug. 8, 2014, issued in respect of corresponding Canadian Patent Application No. 2,773,807.

Examiner's Report dated Feb. 19, 2016, issued on corresponding Canadian Application No. 2,773,807.

* cited by examiner

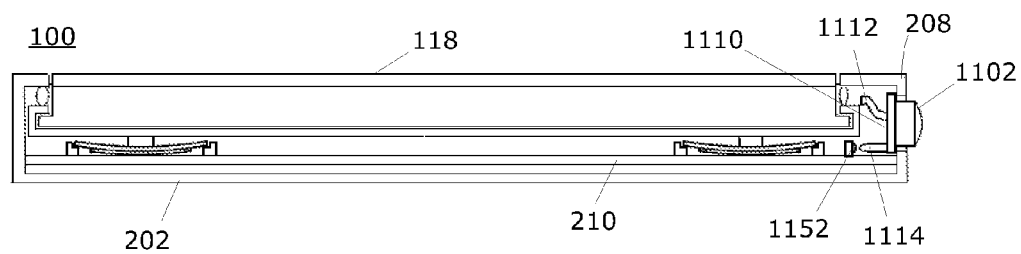
FIG. 11
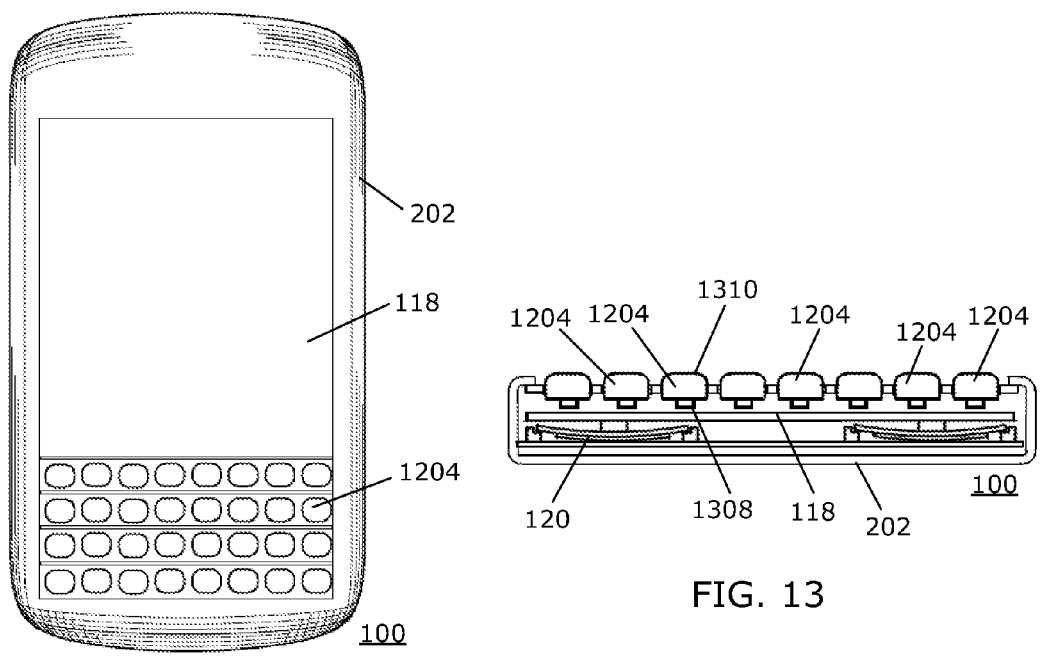
FIG. 12
FIG. 13

ELECTRONIC DEVICE AND METHOD OF PROVIDING TACTILE FEEDBACK

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

BRIEF DESCRIPTION OF DRAWINGS

FIG. 11 is a sectional side view of another example of a portable electronic device with an input device in accordance with the disclosure.

FIG. 12 is a front view of another example of a portable electronic device in accordance with the disclosure.

FIG. 13 is a sectional view through input devices of a keyboard of a portable electronic device in accordance with the disclosure.

DETAILED DESCRIPTION

Figure 1:
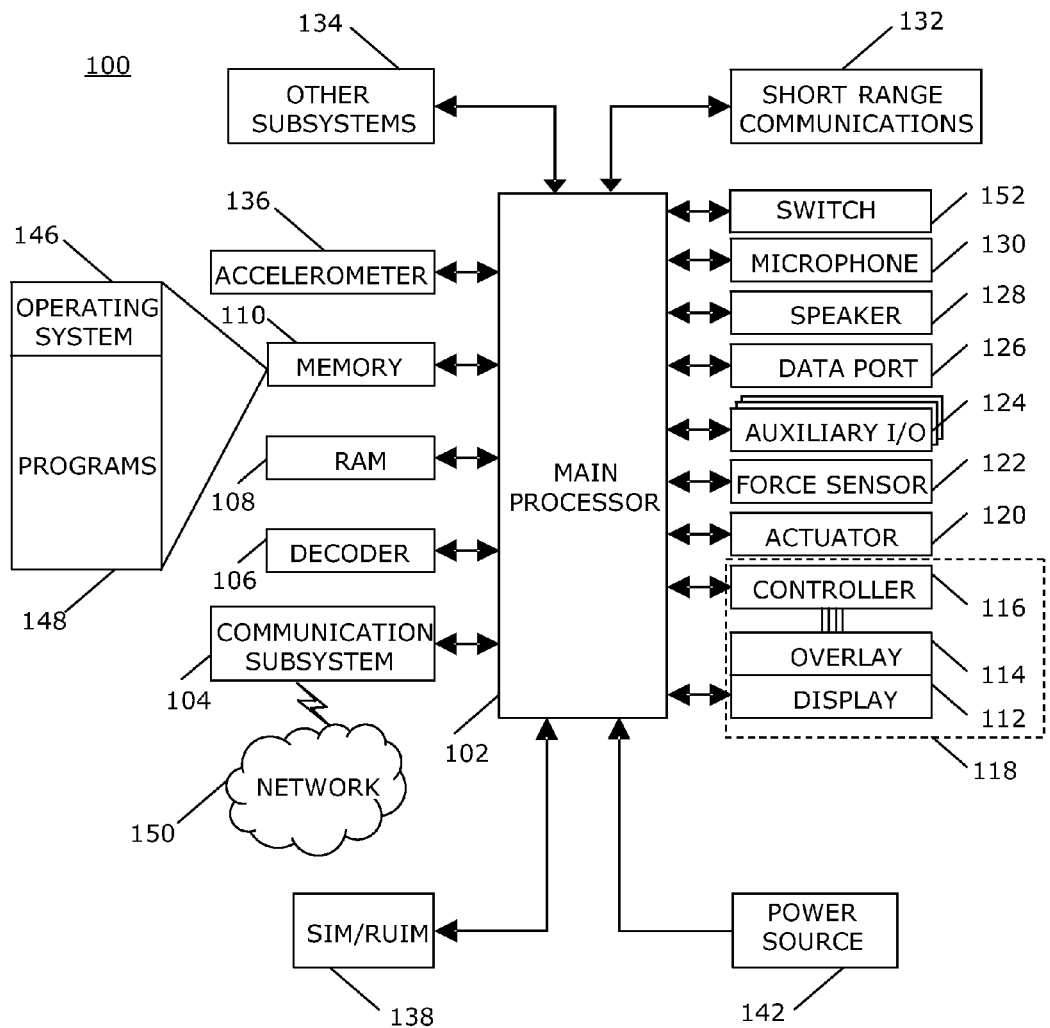
FIG. 1 is a block diagram of a portable electronic device in accordance with the disclosure.

The following describes a portable electronic device that includes a display, such as a touch-sensitive display, an actuator actuatable to impart a force on the display, an input device moveable from a first position in which the input device is disengaged from the display to a second position in which the input device is engaged with the display, wherein when the input device is moved to the second position, the actuator is actuated to provide tactile feedback from the display to the input device.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, and so forth. The portable electronic device may also be a portable electronic device without wireless communication capabilities, such as handheld electronic games, digital photograph albums, digital cameras, media players, e-book readers, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, other device subsystems 134, and a switch 152. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback. Other different types of actuators 120 may be utilized than those described herein. When force is applied, the touch-sensitive display 118 is depressible, pivotable, and/or movable.

Figure 2:
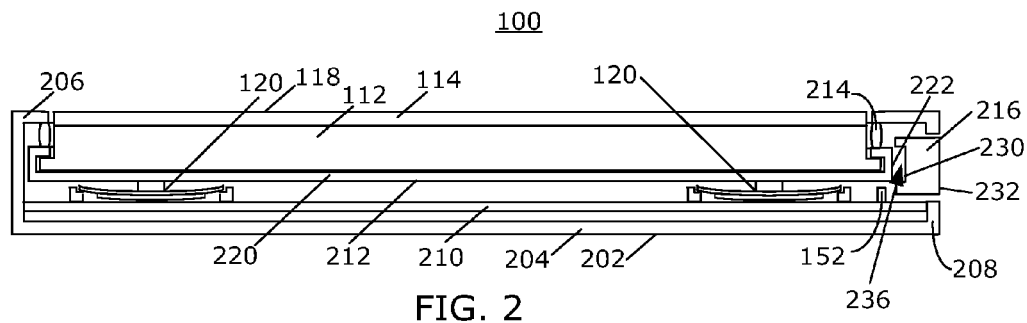
FIG. 2 is a sectional side view of an example of a portable electronic device with an input device in a first position in accordance with the disclosure.

A cross section of a portable electronic device 100 taken through the centers of piezoelectric ("piezo") actuators 120 is shown in FIG. 2. The portable electronic device 100 includes a housing 202 that encloses components such as shown in FIG. 1. The housing 202 may include a back 204, sidewalls 208, and a frame 206 that houses the touch-sensitive display 118. A base 210 extends between the sidewalls 208, generally parallel to the back 204, and supports the actuators 120 and the switch 152. The display 112 and the overlay 114 are supported on a support tray 212 of suitable material, such as magnesium. The support tray 212, the display 112, and the touch-sensitive overlay 114 are generally referred to herein as the touch-sensitive display 118. Optional spacers 214 may be located between the support tray 212 and the frame 206, may advantageously be flexible, and may also be compliant or compressible, and may comprise gel pads, spring elements such as leaf springs, foam, and so forth.

Figure 3:
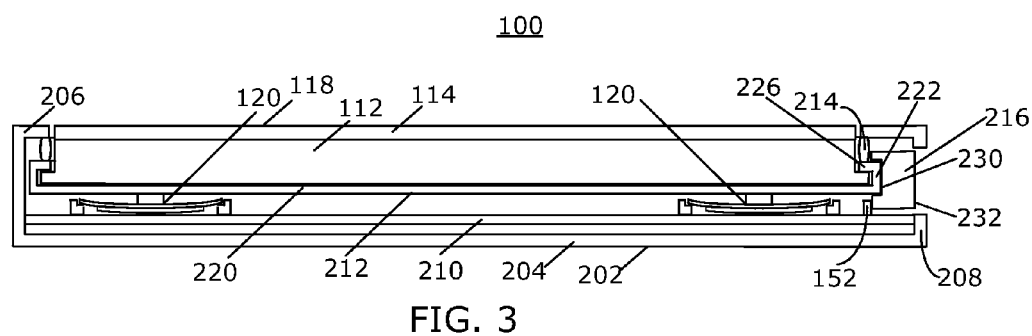
FIG. 3 is a sectional side view of an example of a portable electronic device with the input device in a second position in accordance with the disclosure.

The touch-sensitive display 118 may be moveable and depressible with respect to the housing 202. A force applied to the touch-sensitive display 118 moves, or depresses, the touch-sensitive display 118 toward the base 210. When sufficient force is applied, the actuator 120 is depressed or actuated as shown in FIG. 3. The touch-sensitive display 118 may also pivot within the housing to depress the actuator 120. The actuators 120 may be actuated by pressing anywhere on the touch-sensitive display 118. The processor 102 receives a signal when the actuator 120 is depressed or actuated.

One of the sidewalls 208 of the housing 202 includes an opening. An input device 216 is disposed in the opening of the sidewall 208. The input device 216 may be, for example, a button, such as a push-button, a key, or any other similar depressible element. The input device 216 has an inner end 230 and an outer end 232. The outer end 232 of the input device 216 may be disposed in the opening in the sidewall 208 and is depressible. The inner end 230 of the input device 216 includes a groove 236 that is sized and shaped to receive an end of the touch-sensitive display 118. In this example, the end of the touch-sensitive display 118 includes a flange 222 of the support tray 212 that extends away from the platform 220 and extends parallel to the platform 220, around an end of the display 112.

The input device 216 is biased into a disengaged position, for example, utilizing a spring (or other suitable biasing element) disposed between the inner end 230 of the input device 216 and an end, such as the flange 222, of the support tray 212. Alternatively, a biasing member or any other suitable compressible element may be disposed between the frame 206 of the housing 202 and a side of the input device 216. In the disengaged position, the touch-sensitive display 118 is not disposed in the groove 236, and the inner end 230 of the input device 216 is spaced from the flange 222. The inner end 230 of the input device 216 is also spaced from the switch 152 when the input device 216 is in the disengaged position.

The input device 216 is movable from the disengaged position shown in FIG. 2 to an engaged position shown in FIG. 3. When a force is applied to the outer end 232 of the input device 216, which force is sufficient to overcome the bias of the input device 216, the input device 216 moves from the disengaged position toward the touch-sensitive display 118, to the engaged position. In the engaged position, the end of the touch-sensitive display 118 is received in the groove 236 of the input device 216. The inner end 230 of the input device 216 contacts and activates the switch 152 when the input device 216 is in the engaged position. The processor 102 receives a signal from the switch 152 when the switch 152 is activated.

When the force applied to the outer end 232 of the input device 216 is discontinued, the input device 216 moves to the disengaged position and the switch 152 may be deactivated. The switch 152 may be deactivated when the end 240 of the lower protrusion 236 is moved out of contact with the switch 152. The processor 102 may receive a signal from the switch 152 when the switch 152 is deactivated.

Figure 4:
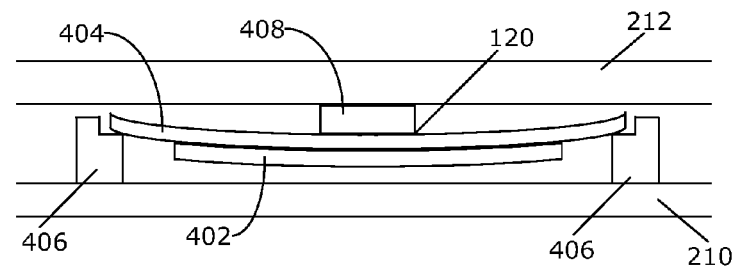
FIG. 4 is a sectional side view of a piezoelectric actuator in accordance with the disclosure.

A cross section taken through the center of a piezo actuator 120 is shown in FIG. 4. The actuator 120 may comprise one or more piezo devices or elements 402. The piezo actuator 120 is shown disposed between the base 210 and the support tray 212. The piezo actuator 120 includes a piezoelectric element 402, such as a piezoelectric ceramic disk, fastened to a substrate 404, for example, by adhesive, lamination, laser welding, and/or by other suitable fastening method or device. The piezoelectric material may be lead zirconate titanate or any other suitable material. Although the piezo element 402 is a ceramic disk in this example, the piezoelectric material may have any suitable shape and geometrical features, for example a non-constant thickness, chosen to meet desired specifications.

The substrate 404, which may also be referred to as a shim, may be comprised of a metal, such as nickel, or any other suitable material such as, for example, stainless steel, brass, and so forth. The substrate 404 bends when the piezo element 402 contracts diametrically, as a result of build up of charge at the piezo element 402 or in response to a force, such as an external force applied to the touch-sensitive display 118.

The substrate 404 and piezo element 402 may be suspended or disposed on a support 406 such as a ring-shaped frame for supporting the piezo element 402 while permitting flexing of the piezo actuator 120 as shown in FIG. 4. The supports 406 may be disposed on the base 210 or may be part of or integrated with the base 210, which may be a printed circuit board. Optionally, the substrate 404 may rest on the base 210, and each actuator 120 may be disposed, suspended, or preloaded in an opening in the base 210. The actuator 120 is not fastened to the support 406 or the base 210 in these embodiments. The actuator 120 may optionally be fastened to the support 406 through any suitable method, such as adhesive or other bonding methods.

Figure 5:
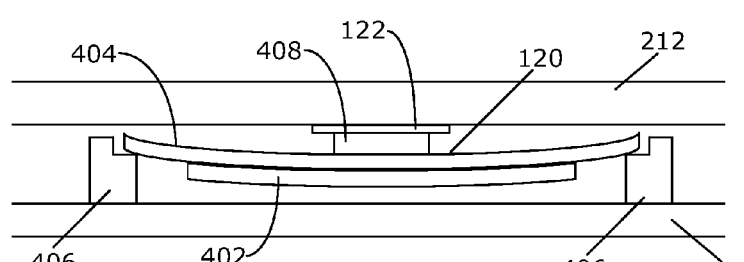
FIG. 5 is a sectional side view of a piezoelectric actuator with a force sensor in accordance with the disclosure.

A pad 408 may be disposed between the piezo actuator 120 and the touch-sensitive display 118. The pad 408 in the present example is a compressible element that may provide at least minimal shock-absorbing or buffering protection and may comprise suitable material, such as a hard rubber, silicone, and/or polyester, and/or other materials. The pad 408 is advantageously flexible and resilient and may provide a bumper or cushion for the piezo actuator 120 as well as facilitate actuation of the piezo actuator 120. One or more optional force sensors 122 may be disposed between the piezo actuator 120 and support tray 212 as shown in FIG. 5. The force sensor 122 may be disposed between the support tray 212 and the pad 408 or between the pad 408 and the piezo actuator 120, to name a few examples. When the touch-sensitive display 118 is depressed, as illustrated in FIG. 3, the force sensor 122 generates a force signal that is received and interpreted by the microprocessor 102. The pad 408 is shown advantageously aligned with a force sensor 122 to facilitate the focus of forces exerted on the touch-sensitive display 118 onto the force sensors 122. The pads 408 transfer forces between the touch-sensitive display 118 and the actuators 120 whether the force sensors 122 are above or below the pads 408. The pads 408 facilitate provision of tactile feedback from the actuators 120 to the touch-sensitive display 118 without substantially dampening the force applied to or on the touch-sensitive display 118.

The force sensors 122 may be force-sensitive resistors, strain gauges, piezoelectric or piezoresistive devices, pressure sensors, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. A piezoelectric device, which may be the piezo element 402, may be utilized as a force sensor.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 6:
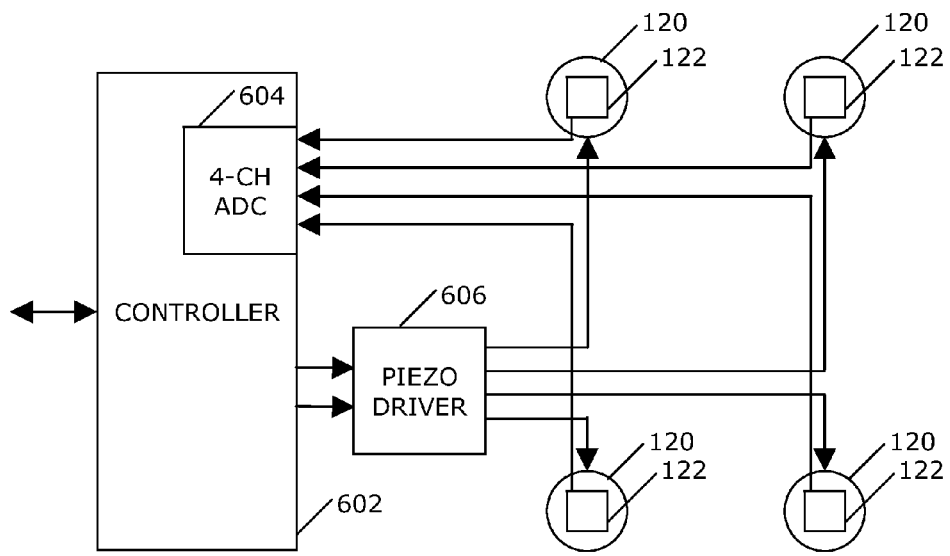
FIG. 6 is a block diagram of a portable electronic device including force sensors and actuators.

A block diagram including force sensors and actuators of the portable electronic device 100 is shown in FIG. 6. In this example, each force sensor 122 is electrically connected to a controller 602, which includes an amplifier and analog-to-digital converter (ADC) 604. Each force sensor 122 may be, for example, a force-sensing resistor wherein the resistance changes as force applied to the force sensor 122 changes. As applied force on the touch-sensitive display 118 increases, the resistance decreases. This change is determined via the controller 116 for each of the force sensors 122, and a value representative of the force at each of the force sensors 122 may be determined.

The piezo actuators 120 are electrically connected to a piezo driver 606 that communicates with the controller 602. The controller 602 is also in communication with the main processor 102 of the portable electronic device 100 and may exchange signals with the main processor 102. The piezo actuators 120 and the force sensors 122 are operatively connected to the main processor 102 via the controller 602. The controller 602 controls the piezo driver 606 that controls the current/voltage to the piezoelectric devices 402 of the actuator 120, and thus the controller 602 controls the force applied by the piezo actuators 120 on the touch-sensitive display 118. The piezoelectric devices 402 may be controlled individually via a separate control line between each actuator 120 and the controller 602. Different signals may be sent to each different actuator 120. Alternatively, the piezoelectric devices 402 may be controlled substantially equally and concurrently, for example, by the same signal that may be provided through a common control line that extends to each actuator 120 or by individual control lines such as shown in FIG. 6.

The tactile feeling of switches, actuators, keys, other physical objects, and so forth may be simulated, or a non-simulated tactile feedback may be provided by controlling the piezoelectric devices 402. For example, when a force applied on the touch-sensitive display 118 exceeds a depression threshold, the voltage/charge at the piezo actuators 120 is modified such that the piezo actuator 120 imparts a force on the touch-sensitive display 118, which force may, for example, simulate depression of a dome switch. When the force applied on the touch-sensitive display 118 falls below a release threshold, the voltage/charge at the piezo actuators 120 is modified such that the piezo actuator 120 imparts a force or discontinues imparting a force on the touch-sensitive display 118, which may, for example, simulate release of a dome switch.

When the input device 202 is in the engaged position, as illustrated in FIG. 3, the switch 152 is activated. The processor 102 receives the signal from the switch 152 and the processor 102 sends an actuation signal to the controller 602. In response to receipt of the actuation signal from the processor 102, the controller 602 actuates the piezo actuators 120, which impart a force on the touch-sensitive display 118. The force imparted on the touch-sensitive display 118 moves the touch-sensitive display 118 and causes movement of the input device 216 as force is transferred from the touch-sensitive display 118 to the input device 216 to provide tactile feedback. Different tactile feedback may be provided for the input device 202 than the touch-sensitive display 118. For example, pulses or vibrations may be provided when a touch is detected on the touch-sensitive display 118 may differ from pulses or vibrations provided when the switch 152 is activated. This difference in tactile feedback provides tactilely distinguishable differences between the touch-sensitive display 118 and the input device 216. When the input device 202 moves to the disengaged position, the switch 152 may be deactivated and actuation of the piezo actuators 120 may be discontinued.

Figure 7:
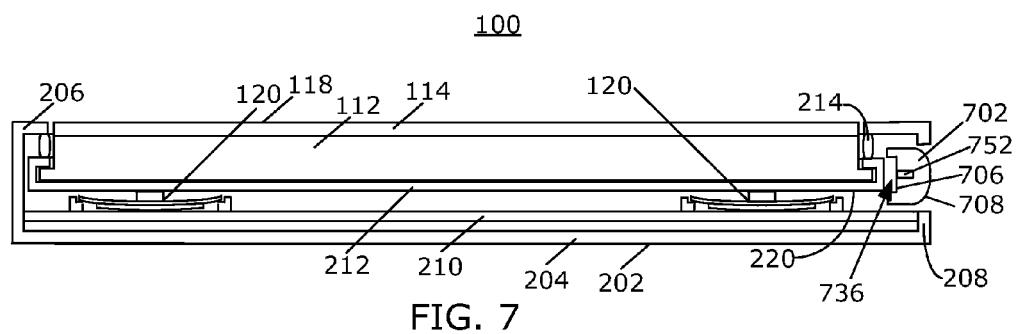
FIG. 7 is a sectional side view of another example of a portable electronic device with an input device in a first position in accordance with the disclosure.

A partial cross section of another example of a portable electronic device 100 taken through the centers of piezoelectric ("piezo") actuators 120 is shown in FIG. 7. An input device 702 is disposed in an opening in the sidewall 208 of the housing 202. In the example illustrated in FIG. 7, the input device 702 is a depressible physical keys such as a button that is moveable between an engaged position and disengaged position and compressible to actuate a switch 752 disposed within the button. The input device 702 has an inner end 706 and an outer end 708. The outer end 708 may be made of resilient, compressible material and may be disposed in the opening in the sidewall 208. The inner end 706 of the input device 702 includes a groove 736 that is sized and shaped to receive an end of the touch-sensitive display 118.

Figure 8:
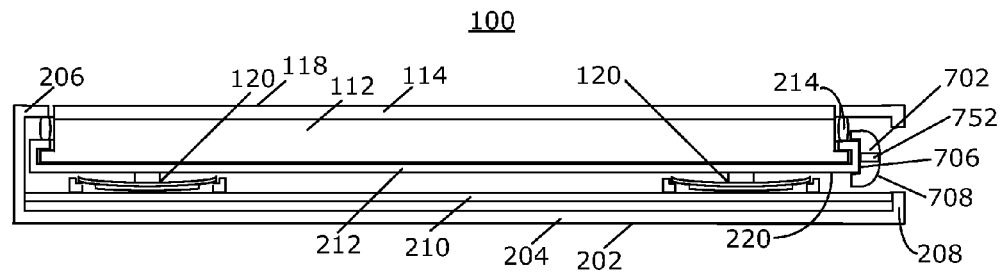
FIG. 8 is a sectional side view of a portable electronic device with the input device in a second position in accordance with the disclosure.

The input device 702 is biased into a disengaged position, in which the inner end 706 of the input device 702 is spaced from the touch-sensitive display 118 and the touch-sensitive display 118 is not disposed in the groove 736. The input device 702 is movable from a disengaged position shown in FIG. 7, in which the outer end 708 of the input device 702 is released, to an engaged position shown in FIG. 8, in which the outer end 708 of the input device 702 is depressed inwardly and compressed. When a force is applied to the outer end 708 of the input device 702, which force is sufficient to overcome the bias of the input device 702, the input device 702 moves from the disengaged position toward the touch-sensitive display 118 to the engaged position and the outer end 708 of the input device 702 is compressed to activate the switch 752. In the engaged position, touch-sensitive display 118 is received in the groove 736.

The processor 102 receives a signal from the switch 752 when the switch 752 is activated and sends an actuation signal to the controller 602. In response to receipt of the actuation signal from the processor 102, the controller 602 actuates the piezo actuators 120, which impart a force on the touch-sensitive display 118. The force imparted on the touch-sensitive display 118 is transferred from the touch-sensitive display 118 to the input device 702 to provide tactile feedback through the touch-sensitive display 118.

When the force applied to the outer end 708 of the input device 702 is discontinued, the outer end 708 of the input device 702 is released and the input device 702 moves to the disengaged position. The switch 752 may be deactivated when the outer end 708 of the input device 702 is released and the actuation of the piezo actuators 120 may be discontinued.

Figure 9:
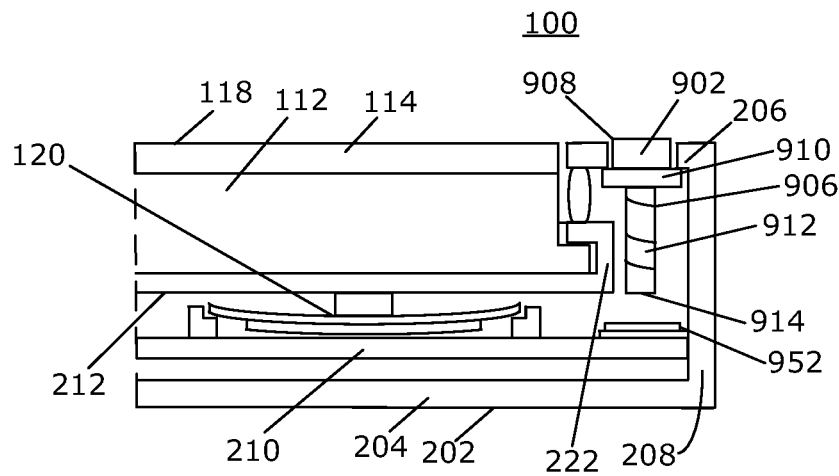
FIG. 9 is a sectional side view of another example of a portable electronic device with an input device in a first position in accordance with the disclosure.

A partial cross section of another example of a portable electronic device 100 taken through the centers of piezoelectric ("piezo") actuators 120 is shown in FIG. 9. In the example illustrated in FIG. 9, an input device 902 is disposed in an opening of the frame 206 of the housing 202. The input device 902 has an inner end 906 and an outer end 908. The inner end 906 of the input device 902 includes a collar 910 and a shaft 912 extending from the collar 910. The outer end 908 of the input device 902 is disposed in the opening and depressible by a user. A switch 952 is disposed on and supported by the base 210 of the housing 202.

The input device 902 is biased into a disengaged position in which the collar 910 is disposed above and spaced from the touch-sensitive display 118. An end 914 of the shaft 912 is disposed above and spaced from a switch 952.

Figure 10:
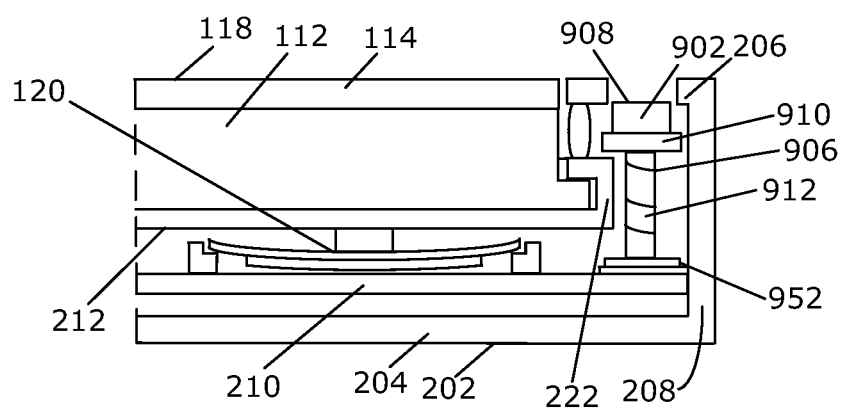
FIG. 10 is a sectional side view of a portable electronic device with the input device in a second position in accordance with the disclosure.

The input device 902 is movable from a disengaged position shown in FIG. 9 to an engaged position shown in FIG. 10. When a force is applied to the outer end 908 of the input device 902, which force is sufficient to overcome the bias of the input device 902, the input device 902 moves from the disengaged position toward the touch-sensitive display 118, to the engaged position. In the engaged position, the collar 910 abuts the touch-sensitive display 118. In this example, an underside of the collar 910 abuts the flange 224 of the support tray 212. The end 914 of the shaft 912 contacts and activates the switch 952. The processor 102 receives a signal from the switch 952 when the switch 952 is activated and sends an actuation signal to the controller 602. In response to receipt of the actuation signal from the processor 102, the controller 602 actuates the piezo actuators 120, which impart a force on the touch-sensitive display 118. The force imparted on the touch-sensitive display 118 is transferred from the touch-sensitive display 118 to the input device 902 to provide tactile feedback.

When the force applied to the outer end 908 of the input device 902 is discontinued, the input device 902 moves to the disengaged position. The switch 952 may be deactivated when the end 914 of the shaft 912 is moved out of contact with the switch 952 and the actuation of the piezo actuators 120 may be discontinued.

Alternatively, a force may be applied to the touch-sensitive display 118 when the collar 910 abuts the flange 224. The force may be detected by a force sensor 122. When a force is detected, the piezo actuators 120 are actuated to provide tactile feedback to the input device 902.

A partial cross section of another example of a portable electronic device 100 taken through the centers of piezoelectric ("piezo") actuators 120 is shown in FIG. 11. In the example illustrated in FIG. 11, the input device 1102 is disposed in an opening of the sidewall 208 of the housing 202. The input device 1102 has an inner end and an outer end 1108. The outer end 1108 the input device 1102 is disposed in the opening and depressible by a user. The inner end includes a groove in which the touch-sensitive display 118 is received when the input device 1102 is in the engaged position. The groove is provided by spaced apart upper and lower protrusions 1112, 1114 extending from a side 1110. A switch 1152 is disposed on and supported by the base 210 of the housing 202.

The input device 1102 is biased into the disengaged position in which the upper protrusion 1112 is spaced from the touch-sensitive display 118 and the lower protrusion 1114 is spaced from the switch 1152, which may be, for example, a dome-type switch.

The input device 1102 is moveable from the disengaged position to the engaged position shown in FIG. 11. When a force is applied to the outer end of the input device 1102, which force is sufficient to overcome the bias of the input device 1102, the input device 1102 moves from the disengaged position toward the touch-sensitive display 118, to the engaged position. In the engaged position, an inner surface of the upper protrusion contacts the touch-sensitive display 118 and the lower protrusion 1114 depresses the switch 1152. The processor 102 receives a signal from the switch 1152 when the switch 1152 is activated and sends an actuation signal to the controller 602. In response to receipt of the actuation signal from the processor 102, the controller 602 actuates the piezo actuators 120, which impart a force on the touch-sensitive display 118. The force imparted on the touch-sensitive display 118 is transferred from the touch-sensitive display 118 to the input device 1102 to provide tactile feedback.

When the force applied to the outer end 1108 of the input device 1102 is discontinued, the input device 1102 moves to the disengaged position and the switch 1152 is released. The switch 1152 may be deactivated when the switch 1152 is released and the actuation of the piezo actuators 120 may be discontinued.

A front view of another example of a portable electronic device 100 is illustrated in FIG. 12, and a sectional view through input devices 1204 of a keyboard or keypad is illustrated in FIG. 13. The keyboard includes a plurality of input devices 1204. The input devices 1204 may comprise, for example, a conductive material, such as metal. The input devices 1204 extend through the housing 202 such that inner ends 1308 of the input devices 1204 are within the housing 202 and outer ends 1310 of the input devices 1204 are outside the housing 202 and are depressible by a user.

The input devices 1204 are biased into a disengaged position in which the inner ends 1208 are spaced from the touch-sensitive display 118.

The input devices 1204 are moveable from the disengaged position to the engaged position shown in FIG. 12. When a force is applied to the outer end 1210 of an input device 1204, which force is sufficient to overcome the bias of the input device 1204, the input device 1204 moves from the disengaged position toward the touch-sensitive display 118, to the engaged position. In the engaged position, the inner end 1208 of input device 1204 touches the touch-sensitive display 118, and the controller 116 detects the touch. Alternatively, the processor 102 may detect the touch by analyzing touch data from the controller 116. The processor 102 receives a signal from the touch-sensitive display 118 and sends an actuation signal to the controller 602 when the touch is detected. In response to receipt of the actuation signal from the processor 102, the controller 602 actuates the piezo actuators 120, which impart a force on the touch-sensitive display 118. The force imparted on the touch-sensitive display 118 is transferred from the touch-sensitive display 118 to the input device 1204 to provide tactile feedback.

When the force applied to the outer end 1210 of the input device 1204 is discontinued, the input device 1204 moves to the disengaged position. The processor 102 may receive a signal from the touch-sensitive display 118 when the inner end 1308 of the input device 1204 moves out of contact with the touch-sensitive display 118 and the actuation of the piezo actuators 120 may be discontinued.

The terms "inner" and "outer" are utilized herein for reference only and are not otherwise limiting. Although the description herein refers to an example of a touch-sensitive display, a non-touch-sensitive display may be utilized as well.

Tactile feedback is provided for one or more touches on the touch-display utilizing one or more actuators. Tactile feedback is also provided to an input device utilizing the same actuators. Lack of confirmation of input to a user may result in an increase in applied force, or an increase in the time during which a force is applied to the input device, causing damage to the input device. A user may also depress the input device multiple times when confirmation of input is not provided, resulting in increased device use time for cancelation or deletion of the additional inputs. Tactile feedback provides confirmation of input, which may reduce the chance of damaging the input device and may reduce device use time.

A portable electronic device includes a touch-sensitive display, an actuator actuatable to impart a force on the touch-sensitive display, an input device moveable from a first position in which the input device is disengaged from the touch-sensitive display to a second position in which the input device is engaged with the touch-sensitive display, wherein when the input device is moved to the second position, the actuator is actuated to provide tactile feedback from the touch-sensitive display to the input device.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A portable electronic device comprising:
    a housing;
    a touch-sensitive display including a display and a display support tray supporting the display and housed by the housing;
    an actuator disposed in the housing and actuatable to impart a force on the touch-sensitive display;
    a physical key disposed in a sidewall of the housing and comprising a push button that is biased into a first position in which the push button is out of contact and is thereby disengaged from the display support tray at an end of the touch-sensitive display, and moveable, by depression of the push button, to a second position in which the push button contacts the display support tray and is thereby engaged with the display support tray at the end of the touch-sensitive display, wherein when the push button is moved to the second position, the actuator is actuated to provide tactile feedback that is transferred from the display support tray at the end of the touch-sensitive display, to the push button.

2. The portable electronic device of claim 1, wherein when the push button is in the first position, tactile feedback is not provided to the push button.

3. The portable electronic device of claim 1, wherein the push button provides an input signal to a processor when moved to the second position.

4. The portable electronic device of claim 1, wherein the display support tray at the end of the touch-sensitive display is received in a groove of the push button when in the second position.

5. The portable electronic device of claim 1, comprising a switch that is activated when the push button is moved to the second position.

6. The portable electronic device of claim 5, wherein the switch provides an input signal to a processor when activated.

7. The portable electronic device of claim 1, wherein the actuator comprises at least one piezoelectric actuator.

8. A method of operating an electronic device to provide tactile feedback, the method comprising:

detecting input from a switch that is activated by a physical key disposed in a sidewall of a housing of the electronic device, the physical key comprising a push button that is moved, by depression of the push button from a first position into which the push button is biased and in which the push button is out of contact and is thereby disengaged from an end of a display support tray of a touch-sensitive display to a second position in which the push button is in contact with and is thereby engaged with the display support tray at the end of the display;

actuating an actuator in response to detecting input from the switch to impart a force on the display, which force is transferred from the display support tray at the end of the touch-sensitive display, to the push button.

9. The method according to claim 8, comprising discontinuing actuating the actuator when the switch is deactivated.

* * * * *